(12) United States Patent
Fox et al.

(10) Patent No.: US 7,578,484 B2
(45) Date of Patent: Aug. 25, 2009

(54) LINK MECHANISMS FOR GAPPED RIGID KRUEGER FLAPS, AND ASSOCIATED SYSTEMS AND METHODS

(75) Inventors: Stephen J. Fox, Everett, WA (US); Seiya Sakurai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 383 days.

(21) Appl. No.: 11/453,596

(22) Filed: Jun. 14, 2006

(65) Prior Publication Data
US 2009/0072093 A1 Mar. 19, 2009

(51) Int. Cl.
*B64C 3/50* (2006.01)
(52) U.S. Cl. ...................................................... 244/214
(58) Field of Classification Search .......... 244/213–217
See application file for complete search history.

(56) References Cited

U.S. PATENT DOCUMENTS

| | | |
|---|---|---|
| 1,770,575 A | 7/1930 | Ksoll |
| 2,086,085 A | 7/1937 | Lachmann et al. |
| 2,138,952 A | 12/1938 | Blume |
| 2,282,516 A | 5/1942 | Hans et al. |
| 2,289,704 A | 7/1942 | Grant |
| 2,319,383 A | 5/1943 | Zap |
| 2,358,985 A | 9/1944 | McAndrew |
| 2,378,528 A | 6/1945 | Arsandaux |
| 2,383,102 A | 8/1945 | Zap |
| 2,385,351 A | 9/1945 | Davidsen |
| 2,387,492 A | 10/1945 | Blaylock et al. |
| 2,389,274 A | 11/1945 | Pearsall et al. |
| 2,422,296 A | 6/1947 | Flader et al. |
| 2,458,900 A | 1/1949 | Emy |
| 2,518,854 A | 8/1950 | Badenoch |

(Continued)

FOREIGN PATENT DOCUMENTS

DE 387833 1/1924

(Continued)

OTHER PUBLICATIONS

U.S. Appl. No. 10/671,435, Robert Kelley-Wickemeyer.

(Continued)

*Primary Examiner*—Michael R Mansen
*Assistant Examiner*—Michael Kreiner
(74) *Attorney, Agent, or Firm*—Perkins Coie LLP (57) ABSTRACT

Link mechanisms for gapped rigid Krueger flaps, and associated methods and systems are disclosed. A system in accordance with one embodiment includes a deployable leading edge assembly that in turn includes a deployable leading edge panel having a generally fixed-shape flow surface, a bullnose coupled to the panel, and a link mechanism coupled to the panel and the bullnose to move the panel between a stowed position and a deployed position. The mechanism can include a first support link, a second support link, and first, second, and third positioning links. The positioning links can be pivotably connected among the leading edge panel, the bullnose, the first support link and the second support link so that the leading edge panel forms a gap with the airfoil when in the deployed position. The positioning links can be the only positioning links coupled between the support links, the leading edge panel, and the bullnose at a particular wing span location.

25 Claims, 6 Drawing Sheets

U.S. PATENT DOCUMENTS

| | | |
|---|---|---|
| 2,555,862 A | 6/1951 | Romani |
| 2,563,453 A | 8/1951 | Briend |
| 2,652,812 A | 9/1953 | Fenzl |
| 2,665,084 A | 1/1954 | Feeney et al. |
| 2,665,085 A | 1/1954 | Feeney et al. |
| 2,702,676 A | 2/1955 | Delaney, Jr. |
| 2,743,887 A | 5/1956 | Fiedler |
| 2,864,239 A | 12/1958 | Taylor |
| 2,877,968 A | 3/1959 | Granan et al. |
| 2,891,740 A | 6/1959 | Campbell |
| 2,892,312 A | 6/1959 | Allen et al. |
| 2,899,152 A | 8/1959 | Weiland |
| 2,920,844 A | 1/1960 | Marshall et al. |
| 2,938,680 A | 5/1960 | Greene et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Dornier |
| 3,136,504 A | 6/1964 | Carr |
| 3,203,275 A | 8/1965 | Hoover |
| 3,203,647 A | 8/1965 | Alvarez-Calderon |
| 3,263,946 A | 8/1966 | Roberts et al. |
| 3,375,998 A | 4/1968 | Alvarez-Calderon |
| 3,423,858 A | 1/1969 | Speno |
| 3,447,763 A | 6/1969 | Allcock |
| 3,486,720 A | 12/1969 | Seglem et al. |
| 3,499,622 A | 3/1970 | Lugan et al. |
| 3,504,870 A | 4/1970 | Cole et al. |
| 3,528,632 A | 9/1970 | Miles et al. |
| 3,556,439 A | 1/1971 | Autry et al. |
| 3,589,648 A | 6/1971 | Gorham et al. |
| 3,642,234 A | 2/1972 | Kamber et al. |
| 3,653,611 A | 4/1972 | Trupp et al. |
| 3,655,149 A | 4/1972 | Williams |
| 3,677,504 A | 7/1972 | Schwarzler |
| 3,704,828 A | 12/1972 | Studer et al. |
| 3,704,843 A | 12/1972 | Jenny |
| 3,730,459 A | 5/1973 | Zuck |
| 3,743,219 A * | 7/1973 | Gorges ................... 244/210 |
| 3,767,140 A | 10/1973 | Johnson |
| 3,776,491 A | 12/1973 | Oulton |
| 3,794,276 A | 2/1974 | Maltby et al. |
| 3,804,267 A | 4/1974 | Cook et al. |
| 3,807,447 A | 4/1974 | Masuda et al. |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,847,369 A | 11/1974 | Phillips et al. |
| 3,862,730 A | 1/1975 | Heiney |
| 3,897,029 A | 7/1975 | Calderon et al. |
| 3,904,152 A | 9/1975 | Hill |
| 3,910,530 A * | 10/1975 | James et al. ................ 244/214 |
| 3,913,450 A | 10/1975 | MacGregor |
| 3,917,192 A | 11/1975 | Alvarez-Calderon |
| 3,941,334 A | 3/1976 | Cole |
| 3,941,341 A | 3/1976 | Brogdon, Jr. |
| 3,954,231 A | 5/1976 | Fraser |
| 3,968,946 A | 7/1976 | Cole |
| 3,987,983 A | 10/1976 | Cole |
| 3,991,574 A | 11/1976 | Frazier |
| 3,992,979 A | 11/1976 | Smith |
| 3,994,451 A | 11/1976 | Cole |
| 4,011,888 A | 3/1977 | Whelchel et al. |
| 4,015,787 A | 4/1977 | Maieli et al. |
| 4,049,219 A | 9/1977 | Dean et al. |
| 4,117,996 A | 10/1978 | Sherman |
| 4,120,470 A | 10/1978 | Whitener |
| 4,131,253 A | 12/1978 | Zapel |
| 4,146,200 A | 3/1979 | Borzachillo |
| 4,159,089 A * | 6/1979 | Cole ...................... 244/214 |
| 4,171,787 A | 10/1979 | Zapel |
| 4,172,575 A | 10/1979 | Cole |
| 4,181,275 A | 1/1980 | Moelter et al. |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,202,519 A * | 5/1980 | Fletcher ................... 244/214 |
| 4,240,255 A | 12/1980 | Benilan |
| 4,248,395 A | 2/1981 | Cole |
| 4,262,868 A | 4/1981 | Dean |
| 4,275,942 A | 6/1981 | Steidl |
| 4,283,029 A | 8/1981 | Rudolph |
| 4,285,482 A | 8/1981 | Lewis |
| 4,293,110 A | 10/1981 | Middleton et al. |
| 4,312,486 A | 1/1982 | McKinney |
| 4,351,502 A | 9/1982 | Statkus |
| 4,353,517 A | 10/1982 | Rudolph |
| 4,360,176 A | 11/1982 | Brown |
| 4,363,098 A | 12/1982 | Buus et al. |
| 4,365,774 A | 12/1982 | Coronel |
| 4,368,937 A | 1/1983 | Palombo et al. |
| 4,384,693 A | 5/1983 | Pauly |
| 4,427,168 A | 1/1984 | McKinney |
| 4,441,675 A | 4/1984 | Boehringer |
| 4,448,375 A | 5/1984 | Herndon |
| 4,459,084 A | 7/1984 | Clark |
| 4,461,449 A | 7/1984 | Turner |
| 4,470,569 A | 9/1984 | Shaffer et al. |
| 4,471,927 A | 9/1984 | Rudolph |
| 4,475,702 A | 10/1984 | Cole |
| 4,485,992 A | 12/1984 | Rao |
| 4,496,121 A | 1/1985 | Berlin |
| 4,498,646 A | 2/1985 | Proksch |
| 4,533,096 A | 8/1985 | Baker |
| 4,542,869 A | 9/1985 | Brine |
| 4,544,117 A | 10/1985 | Schuster |
| 4,553,722 A | 11/1985 | Cole |
| 4,575,030 A | 3/1986 | Gratzer |
| 4,576,347 A | 3/1986 | Opsahl |
| 4,605,187 A | 8/1986 | Stephenson |
| 4,618,109 A | 10/1986 | Victor |
| 4,637,573 A | 1/1987 | Perin et al. |
| 4,650,140 A | 3/1987 | Cole |
| 4,669,687 A | 6/1987 | Rudolph |
| 4,700,911 A | 10/1987 | Zimmer |
| 4,702,441 A | 10/1987 | Wang |
| 4,702,442 A | 10/1987 | Weiland et al. |
| 4,706,913 A | 11/1987 | Cole |
| 4,717,097 A | 1/1988 | Sepstrup |
| 4,729,528 A | 3/1988 | Borzachillo |
| 4,779,822 A | 10/1988 | Burandt et al. |
| 4,784,355 A | 11/1988 | Brine |
| 4,786,013 A | 11/1988 | Pohl |
| 4,796,192 A | 1/1989 | Lewis |
| 4,823,836 A | 4/1989 | Bachmann et al. |
| 4,834,319 A | 5/1989 | Ewy et al. |
| 4,838,503 A | 6/1989 | Williams et al. |
| 4,854,528 A | 8/1989 | Hofrichter et al. |
| 4,856,735 A | 8/1989 | Lotz et al. |
| 4,892,274 A | 1/1990 | Pohl et al. |
| 4,899,284 A | 2/1990 | Lewis |
| 4,962,902 A | 10/1990 | Fortes |
| 5,039,032 A | 8/1991 | Rudolph |
| 5,046,688 A | 9/1991 | Woods |
| 5,056,741 A | 10/1991 | Bliesner et al. |
| 5,074,495 A | 12/1991 | Raymond |
| 5,082,207 A | 1/1992 | Tulinius |
| 5,082,208 A | 1/1992 | Matich |
| 5,088,665 A | 2/1992 | Vijgen et al. |
| 5,094,411 A | 3/1992 | Rao |

| | | | | | | |
|---|---|---|---|---|---|---|
| 5,094,412 | A | 3/1992 | Narramore | 6,568,189 B2 | 5/2003 | Blot-Carretero et al. |
| 5,098,043 | A | 3/1992 | Arena | 6,591,169 B2 | 7/2003 | Jones |
| 5,100,082 | A | 3/1992 | Archung | 6,598,829 B2 | 7/2003 | Kamstra |
| 5,114,100 | A | 5/1992 | Rudolph | 6,598,834 B2 | 7/2003 | Nettle |
| 5,129,597 | A | 7/1992 | Manthey | 6,601,801 B1 | 8/2003 | Prow |
| 5,158,252 | A | 10/1992 | Sakurai | 6,622,972 B2 | 9/2003 | Urnes, Sr. et al. |
| 5,167,383 | A | 12/1992 | Nozaki | 6,622,974 B1 | 9/2003 | Dockter et al. |
| 5,203,619 | A | 4/1993 | Welsch | 6,625,982 B2 | 9/2003 | Van Den Bossche |
| 5,207,400 | A | 5/1993 | Jennings | 6,644,599 B2 | 11/2003 | Perez |
| 5,222,692 | A | 6/1993 | Glowacki et al. | 6,651,930 B1 | 11/2003 | Gautier et al. |
| 5,244,269 | A | 9/1993 | Harriehausen | 6,698,523 B2 | 3/2004 | Barber |
| 5,259,293 | A | 11/1993 | Brunner | 6,729,583 B2 | 5/2004 | Milliere et al. |
| 5,282,591 | A | 2/1994 | Walters et al. | 6,796,526 B2 | 9/2004 | Boehringer |
| 5,310,387 | A | 5/1994 | Savagian | 6,796,534 B2 | 9/2004 | Beyer et al. |
| 5,351,914 | A | 10/1994 | Nagao | 6,799,739 B1 | 10/2004 | Jones |
| 5,388,788 | A | 2/1995 | Rudolph | 6,802,475 B2 | 10/2004 | Davies et al. |
| 5,441,218 | A | 8/1995 | Mueller et al. | 6,843,452 B1 | 1/2005 | Vassberg et al. |
| 5,474,265 | A * | 12/1995 | Capbern et al. ............. 244/214 | 6,860,452 B2 | 3/2005 | Bacon et al. |
| 5,493,497 | A | 2/1996 | Buus | 6,870,490 B2 | 3/2005 | Sherry |
| 5,535,852 | A | 7/1996 | Bishop | 6,910,659 B2 | 6/2005 | Friddell et al. |
| 5,544,847 | A | 8/1996 | Bliesner | 7,007,897 B2 | 3/2006 | Wingett et al. |
| 5,564,655 | A | 10/1996 | Garland et al. | 7,051,975 B2 | 5/2006 | Pohl et al. |
| 5,600,220 | A | 2/1997 | Thoraval | 7,147,241 B2 | 12/2006 | Beaujot et al. |
| 5,609,020 | A | 3/1997 | Jackson | 2001/0006207 A1 | 7/2001 | Caton et al. |
| 5,628,477 | A | 5/1997 | Caferro et al. | 2002/0046087 A1 | 4/2002 | Hey |
| 5,680,124 | A | 10/1997 | Bedell | 2002/0074459 A1 | 6/2002 | Gleine et al. |
| 5,681,014 | A | 10/1997 | Palmer | 2002/0100842 A1 | 8/2002 | Perez |
| 5,686,907 | A | 11/1997 | Bedell et al. | 2003/0132860 A1 | 7/2003 | Feyereisen et al. |
| 5,711,496 | A | 1/1998 | Nusbaum | 2003/0197097 A1 | 10/2003 | Wakayama |
| 5,735,485 | A | 4/1998 | Ciprian et al. | 2003/0230677 A1 | 12/2003 | Milliere |
| 5,743,490 | A | 4/1998 | Gillingham | 2004/0004162 A1 | 1/2004 | Beyer |
| 5,788,190 | A | 8/1998 | Siers | 2004/0059474 A1 | 3/2004 | Boorman |
| 5,836,550 | A | 11/1998 | Pacz | 2004/0195464 A1 | 10/2004 | Vassberg et al. |
| 5,839,698 | A | 11/1998 | Moppert | 2004/0245386 A1 | 12/2004 | Huynh |
| 5,875,998 | A | 3/1999 | Gleine et al. | 2005/0011994 A1 | 1/2005 | Sakurai et al. |
| 5,915,653 | A | 6/1999 | Koppelman | 2005/0017126 A1 | 1/2005 | McLean et al. |
| 5,921,506 | A | 7/1999 | Appa | 2005/0045765 A1 | 3/2005 | Pitt |
| 5,927,656 | A | 7/1999 | Hinkleman | 2005/0109876 A1 | 5/2005 | Jones |
| 5,934,615 | A | 8/1999 | Treichler | 2005/0242234 A1 | 11/2005 | Mahmulyin |
| 5,984,230 | A | 11/1999 | Drazi | 2006/0038086 A1 | 2/2006 | Reckzeh |
| 6,015,117 | A | 1/2000 | Broadbent | 2006/0145028 A1 | 7/2006 | Richter et al. |
| 6,045,204 | A | 4/2000 | Frazier | 2006/0169847 A1 | 8/2006 | Konings |
| 6,073,624 | A | 6/2000 | Laurent | 2006/0226297 A1 | 10/2006 | Perez-Sanchez |
| 6,076,767 | A | 6/2000 | Farley et al. | 2006/0245882 A1 | 11/2006 | Khan et al. |
| 6,076,776 | A | 6/2000 | Breitbach | 2007/0252040 A1 | 11/2007 | Kordel et al. |
| 6,082,679 | A | 7/2000 | Crouch et al. | | | |
| 6,109,567 | A | 8/2000 | Munoz | | | |

FOREIGN PATENT DOCUMENTS

| | | |
|---|---|---|
| DE | 1129379 | 5/1962 |
| EP | 0100775 | 2/1984 |
| EP | 0 103 038 | 3/1984 |
| EP | 0215211 | 3/1987 |
| EP | 0 483 504 | 5/1992 |
| EP | 0781704 | 7/1997 |
| EP | 0 947 421 | 10/1999 |
| EP | 1010616 | 6/2000 |
| EP | 1338506 | 8/2003 |
| EP | 1462361 | 9/2004 |
| EP | 1 547 917 | 6/2005 |
| EP | 1607324 | 12/2005 |
| FR | 705155 | 6/1931 |
| FR | 984443 | 7/1951 |
| FR | 56121 | 9/1952 |
| FR | 57988 | 9/1953 |
| FR | 58273 | 11/1953 |
| GB | 1181991 | 2/1970 |
| GB | 2 144 688 A | 3/1985 |

| | | | |
|---|---|---|---|
| 6,152,405 | A | 11/2000 | Muller et al. |
| 6,161,801 | A | 12/2000 | Kelm |
| 6,164,598 | A | 12/2000 | Young et al. |
| 6,164,599 | A | 12/2000 | Piening et al. |
| 6,189,837 | B1 | 2/2001 | Matthews |
| 6,213,433 | B1 | 4/2001 | Gruensfelder |
| 6,227,498 | B1 | 5/2001 | Arata |
| 6,244,542 | B1 | 6/2001 | Young et al. |
| 6,293,497 | B1 | 9/2001 | Kelley-Wickemeyer |
| 6,328,265 | B1 | 12/2001 | Dizdarevic |
| 6,349,798 | B1 | 2/2002 | McKay |
| 6,364,254 | B1 | 4/2002 | May |
| 6,375,126 | B1 | 4/2002 | Sakurai |
| 6,431,498 | B1 | 8/2002 | Watts et al. |
| 6,439,512 | B1 | 8/2002 | Hart |
| 6,443,394 | B1 | 9/2002 | Weisend |
| 6,464,175 | B2 | 10/2002 | Yada et al. |
| 6,466,141 | B1 | 10/2002 | McKay et al. |
| 6,478,541 | B1 | 11/2002 | Charles et al. |
| 6,481,667 | B1 | 11/2002 | Ho |
| 6,484,969 | B2 | 11/2002 | Sprenger |
| 6,499,577 | B2 | 12/2002 | Kitamoto et al. |
| 6,513,761 | B2 | 2/2003 | Huenecke et al. |
| 6,536,714 | B2 | 3/2003 | Gleine et al. |
| 6,547,183 | B2 | 4/2003 | Farnsworth |
| 6,554,229 | B1 | 4/2003 | Lam |

OTHER PUBLICATIONS

U.S. Appl. No. 10/770,256, Speer.
U.S. Appl. No. 10/789,100, Lacy et al.
U.S. Appl. No. 10/868,234, Rampton et al.
U.S. Appl. No. 10/868,238, Dun.

U.S. Appl. No. 10/935,846, Good et al.
U.S. Appl. No. 10/955,686, Wheaton et al.
U.S. Appl. No. 10/959,629, Jones.
U.S. Appl. No. 11/048,320, Konings.
U.S. Appl. No. 11/051,738, Huynh et al.
U.S. Appl. No. 11/116,905, Good et al.
U.S. Appl. No. 11/134,019, filed May 20, 2005, Voogt.
U.S. Appl. No. 11/200,843, Sakurai et al.
U.S. Appl. No. 11/284,113, filed Nov. 21, 2005, Lacy et al.
"Adaptive Aircraft: No Flight of Fancy?" Research into using exotic means of making wings change shape in-flight looks promising, though still a long way from reality, Business Week Online, Jan. 7, 2003, pp. 1-3.
"Aero-Space Research & Technology," Space Systems, Sep. 1, 2001, pp. 1-28.
"Morphing aircraft Structure,"—Penn State University, www.personal.psu.edu/users/d/s/dsr134/mas/Cellular.htm, pp. 1-3.
"Morphing Aircraft Structures,"—Raytheon, www.defense-update.com, pp. 1-3.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).
Drela, M., "Optimization Techniques In Airfoil Design," MIT Aero & Astro, 29 pages.
Drela, Mark, "Design and Optimization Method for Multi-Element Airfoils," MIT Department of Aeronautics and Astronautics, Copyright 1993 America Institute of Aeronautics and Astronautics, Inc. (pp. 1-11).
Flap Drive System, 777 Maintenance Manual, Publication Date: Circa 1994 (1 page).
Flap Transmission and Support, 777 Maintenance Manual, Publication Date: Circa 1994 (1 page).
Hansen, H., "Application of Mini-Trailing-Edge Devices in the Aviator Project," Airbus Deutschland, EGAG, Hunefeldstr. 1-5, D-28199 Bremen, Germany, 9 pages.
Junkers JU 52/3M (2 pages); http://www.wpafb.af.mil/museum/outdoor/od16;[Accessed Aug. 7, 2003].
Moog, Component Maintenance Manual, May 1994 (2 pages).
Morphing Systems, "Morphing Aerostructures-An Overview," www.crgrp.net/morphingsystems.htm, pp. 1-9; [accessed Aug. 31, 2005].
Niu, Chen-Yen, Airframe Structural Design, Chen-Yeun Niu, Conmilit Press, 1988 (1 page).
Petrov, A.V., "Certain Types of Separated Flow over Slotted Wings," Fluid Mechanics—Soviet Research, vol. 7, No. 5, Sep.-Oct. 1978, p. 80-89.
The High Speed Frontier, Chapter 2: The High-Speed Airfoil Program, "Supercritical" Airfoils, 1957-1978 (4 pages); http://www.hq.nasa.gov/office/pao/History/SP-445/ch2-5.
TU-144 Canard, (date unknown), 1 pg.
Whitcomb, Richard T., "Review of NASA Supercritical Airfoils," National Aeronautics and Space Administration, Aug. 1974 (pp. 8-18).
Leaf Spring Retainer Seals; EPM, Inc.; 2 pgs.
"777 Maintenance Manual-Flap Drive System,"-Published circa 1994, p. 1.
"777 Maintenance Manual-Flap Transmission and Support," Published circa 1994, p. 1.
"Flap (aircraft)," Wikipedia, The Free Encyclopedia, Jul. 20, 2006, 14:15 revision, <http://en.wikipedia.org/w/index.php?title=Flap_%28aircraft%29&oldid=67413665> [accessed Aug. 5, 2006] pp. 1-2.
"Slats" Wikipedia, The Free Encyclopedia, Jun. 27, 2006, 12-23:00 revision, <http://wn.wikipedia.org/w/index.php?title=Slats&oldid=60827639> [accessed Aug. 6, 2006], pp. 1-2.
International Search Report for Application No. PCT/US2007/008301, The Boeing Company, Jun. 23, 2008, 3 pages.
Rea, Jon, "Boeing 777 High Lift Control System," Boeing Commercial Airplane Group, IEEE AES Systems Magazine, Aug. 1993, pp. 15-21.

* cited by examiner

LINK MECHANISMS FOR GAPPED RIGID KRUEGER FLAPS, AND ASSOCIATED SYSTEMS AND METHODS

TECHNICAL FIELD

The present disclosure is directed generally to link mechanisms for gapped, rigid Krueger flaps, and associated systems and methods.

BACKGROUND

Modern aircraft often use a variety of high lift leading and trailing edge devices to improve high angle of attack performance during various phases of flight, including takeoff and landing. Existing leading edge devices include leading edge slats and Krueger flaps. Current leading edge slats generally have a stowed position in which the slat forms a portion of the leading edge of the wing, and one or more deployed positions in which the slat extends forward and down to increase the camber and/or planform area of the wing. The stowed position is generally associated with low drag at low angles of attack and can be suitable for cruise and other low angle of attack operations. The extended position(s) is/are generally associated with improved airflow characteristics over the aircraft's wing at higher angles of attack. Typical leading edge slat designs include arrangements in which the leading edge device retracts in an aft direction to form the leading edge of the wing when stowed. Krueger flaps have generally the same function as leading edge slats, but rather than retracting aft to form the leading edge of the wing, Krueger flaps typically fold into the lower surface of the wing when stowed.

In some cases, a slot or gap is created between the leading edge device and the wing as the device extends. During certain operating conditions, air can flow through this slot to energize the airflow over the upper surface of the wing, and improve overall airflow characteristics over the wing. A drawback with current systems is that it can be difficult to properly form and/or properly place the gap to achieve the desired flow characteristics proximate to the leading edge device. Another drawback associated with Krueger flap arrangements is that it may be difficult to form a gap that is large enough to achieve the desired airflow characteristics, without requiring complex and/or structurally inefficient linkage mechanisms.

SUMMARY

The following summary is provided for the benefit of the reader only, and is not intended to limit in any way the invention as set forth by the claims. The present invention is directed generally toward link mechanisms for gapped, rigid Krueger flaps, and associated systems and methods. An aircraft system in accordance with one aspect of the invention includes a deployable leading edge assembly that in turn includes a deployable leading edge panel having a generally fixed-shape flow surface, a bullnose pivotably coupled to the leading edge panel, and a link mechanism coupled to the leading edge panel and the bullnose to move the leading edge panel between a stowed position and a deployed position. The link mechanism can have first and second spaced apart support links that are pivotably coupleable to an airfoil. First, second, and third positioning links are pivotably connected among the leading edge panel, the bullnose, and the first and second support links. The leading edge panel forms a gap with the airfoil when in the deployed position, and the positioning links are the only positioning links coupled between the support links, the leading edge panel, and the bullnose at a particular wing span location. Accordingly, in at least some embodiments, the leading edge assembly can include a five-link arrangement that provides a suitable aerodynamic gap between the airfoil and the rigid deployable leading edge panel, while also providing a bullnose to guide the flow of air over the airfoil.

In further particular aspects, the first positioning link has a first end, a second end, and an intermediate portion between its first and second ends. The first positioning link is pivotably connected to the second support link toward its first end, to the leading edge panel toward its second end, and to the first support link at its intermediate portion to form a scissors arrangement with the first support link. The second positioning link has a first end, a second end, and an intermediate portion between its first and second ends, and is pivotably connected to the first support link toward its first end, to the third positioning link toward its second end, and to the leading edge panel at its intermediate portion. The gap formed by deploying the leading edge assembly with the link mechanism can be at least 2% of the chord length of the airfoil to which the leading edge assembly is attached. In further particular embodiments, each of the links can be generally straight. In other embodiments, the opposite ends of the links can be offset by 40° or less, and in still further particular embodiments, by 20° or less.

Further aspects are directed toward methods for operating an aircraft system. One method includes deploying a rigid leading edge panel and a rigid bullnose relative to an airfoil by rotating a first support link pivotably coupled to the airfoil at a wingspan location, rotating a second support link pivotably coupled to the airfoil and spaced apart from the first support link, and rotating first, second, and third positioning links. The first, second, and third positioning links are pivotably connected among the leading edge panel, the bullnose, the first support link, and the second support link, and are the only positioning links coupled between the support links, the leading edge panel, and the bullnose at the wingspan location. The method can still further include forming a gap between the leading edge panel and the airfoil, and rotating the bullnose relative to the leading edge panel.

DETAILED DESCRIPTION

The present disclosure describes link mechanisms for gapped rigid Krueger flaps, and associated systems and methods. Certain specific details are set forth in the following description and in FIGS. 1-6 to provide a thorough understanding of various embodiments of the invention. Well-known structures, systems and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
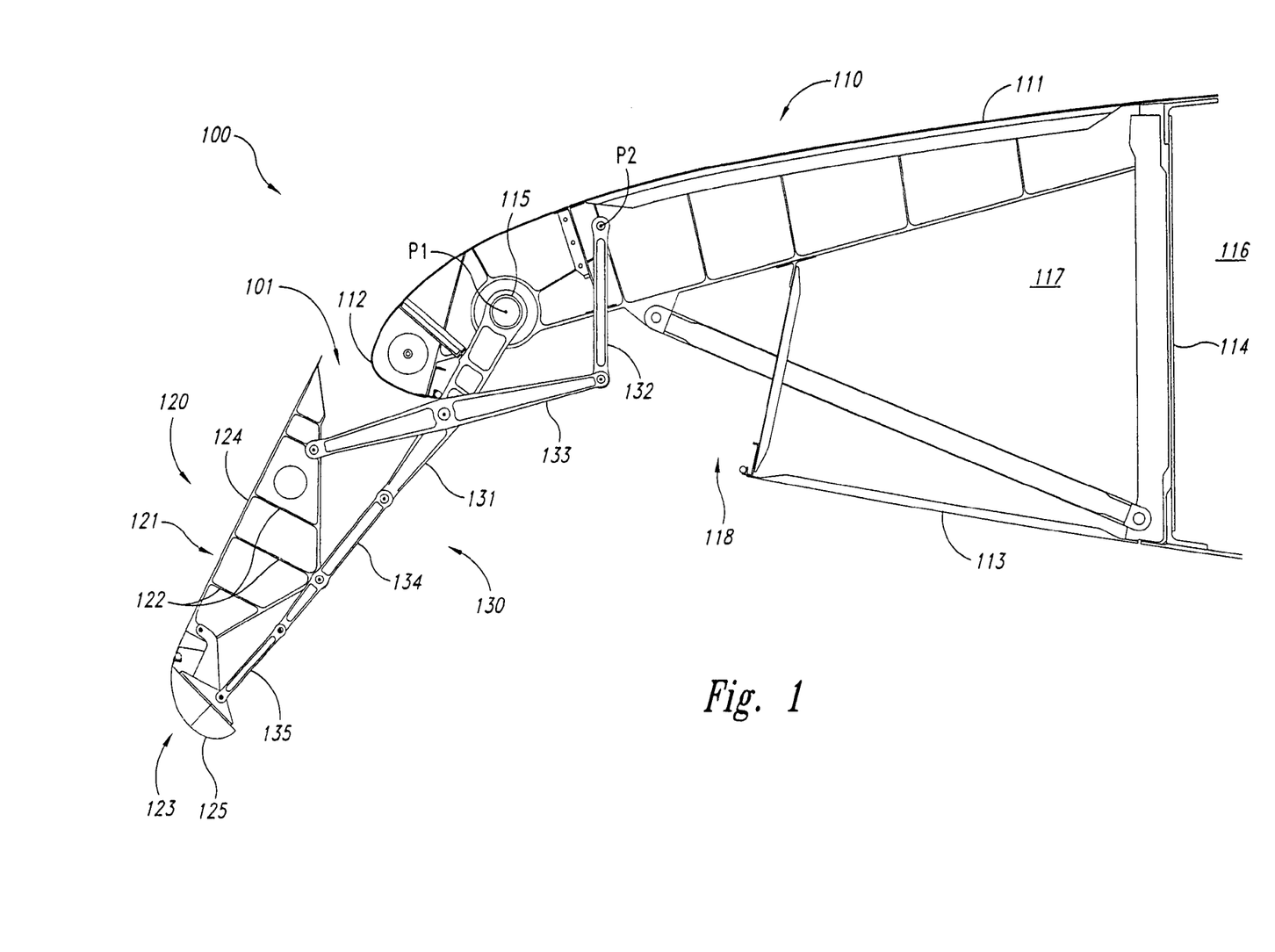
FIG. 1 is a partially schematic, cross-sectional elevation view of a system that includes a deployable leading edge assembly and link mechanism configured in accordance with an embodiment of the invention, and shown in a deployed position.

FIG. 1 is a partially schematic, cross-sectional side elevation view of an aircraft system 100 having a deployable leading edge assembly 120 and an associated link mechanism 130 configured in accordance with an embodiment of the invention. The leading edge assembly 120 is configured to provide enhanced high lift characteristics for an airfoil 110 on which it is installed. General attributes of the airfoil 110 and more detailed attributes of the leading edge assembly 120 and the link mechanism 130 are described below.

The airfoil 110 can be configured for operation over any of a variety of flight conditions. The particular airfoil 110 shown in FIG. 1 is configured for cruise at high subsonic Mach numbers representative of typical commercial transport airliners. Accordingly, the airfoil 110 can include a wing upper surface 111, a wing lower surface 113, and a relatively blunt leading edge 112 that is faired smoothly into both the upper surface 111 and the lower surface 113. The lower surface 113 of the airfoil 110 can include an opening 118. When the leading edge assembly 120 is in its stowed position (described later with reference to FIG. 4), it seals the opening 118 to provide for a generally continuous, aerodynamically smooth lower surface 113. When the leading edge assembly 120 is moved to its deployed position, as shown in FIG. 1, the opening 118 is exposed.

A forward bulkhead 114 separates an aft fuel bay 116 from a leading edge dry bay 117. The leading edge dry bay 117 houses the link mechanism 130. The link mechanism 130 can be powered by any number of actuator arrangements, including a torque tube 115 that extends generally transverse to the plane of FIG. 1 along the leading edge 112, and can be coupled to multiple link mechanisms 130 along the span of the airfoil 110. For purposes of illustration, one link mechanism 130 at a particular spanwise location is shown in FIG. 1. As described later with reference to FIG. 6, multiple link mechanisms 130 may be positioned in a spanwise direction to control the motion of one or more deployable leading edge assemblies 120.

The leading edge assembly 120 can include a leading edge panel 121 and a bullnose 123 that is pivotably connected to the rigid leading edge panel 121. The leading edge panel 121 can include a streamwise flow surface 124 that has a generally rigid, fixed shape. A panel support structure 122 can be positioned to support the streamwise flow surface 124 and maintain its shape. Accordingly, the streamwise flow surface 124 may undergo small deflections due to aerodynamic loading, but has generally the same shape shown in FIG. 1 when in any of its deployed positions, and when in its stowed position. The bullnose 123 can also include a generally rigid, fixed-shape bullnose flow surface 125. Unlike variable camber Krueger flap arrangements, an embodiment of the leading edge assembly 120 shown in FIG. 1 uses the functionality of the generally fixed-shape flow surfaces 124, 125, and the link mechanism 130 (rather than flexibility of the streamwise flow surface 124), to produce the desired airflow characteristics at a variety of positions.

The leading edge assembly 120 is shown in its fully deployed position in FIG. 1. In this position, the leading edge panel 121 is positioned downwardly and forwardly of the airfoil leading edge 112, and forms a gap 101 with the leading edge 112. The bullnose 123 is positioned slightly forwardly and downwardly of the leading edge panel 121. In this configuration, the leading edge assembly 120 effectively forms a much blunter (through reasonably aerodynamically efficient) leading edge for the airfoil 110, which allows the airfoil 110 to operate efficiently at high angles of attack. Such angles of attack are typically encountered during approach, landing, and takeoff.

The gap 101 formed between the leading edge panel 121 and the leading edge 112 can further improve the aerodynamic performance of the overall system 100. In many cases, it may be desirable to have a relatively large gap when the leading edge assembly 120 is in its fully deployed position. For example, it may be desirable to have a gap 101 that is up to and in come cases greater than 2% of the overall chord length of the airfoil 110 (e.g., the distance between the airfoil leading edge 112 and the airfoil trailing edge, which not visible in FIG. 1). Accordingly, it may be desirable to have a gap between the leading edge 112 and the leading edge panel 121 of up to 8 inches on an airfoil having a local chord length of 400 inches. However, it has been challenging to develop a system that is structurally efficient, creates the large desired gap 101, and moves the leading edge assembly 120 between its deployed position (shown in FIG. 1) and its stowed position (described below with reference to FIG. 4). Embodiments of the link mechanism 130 described below can address these issues.

The link mechanism 130 can include support links that are connected to the airfoil 110, and positioning links that are connected between the support links and the leading edge assembly 120. For example, in an embodiment shown in FIG. 1, the link mechanism 130 can include a first support link 131 attached to the torque tube 115 at a pivot joint P1. A second support link 132 can be positioned aft of the first support link 131 and can be pivotably attached to the airfoil structure at another pivot joint P2. A first positioning link 133 can be pivotably connected to the first support link 131, the second support link 132, and the leading edge panel 121. A second positioning link 134 can be pivotably connected to the first support link 131, the leading edge panel 121, and a third positioning link 135. The third positioning link 135 can be pivotably connected between the second positioning link 134 and the bullnose 123. This five-link arrangement can efficiently move the leading edge assembly 120 (e.g., the leading edge panel 121 and the bullnose 123) between the fully deployed position shown in FIG. 1 and other positions described below with reference to FIGS. 2-4.

Figure 2:
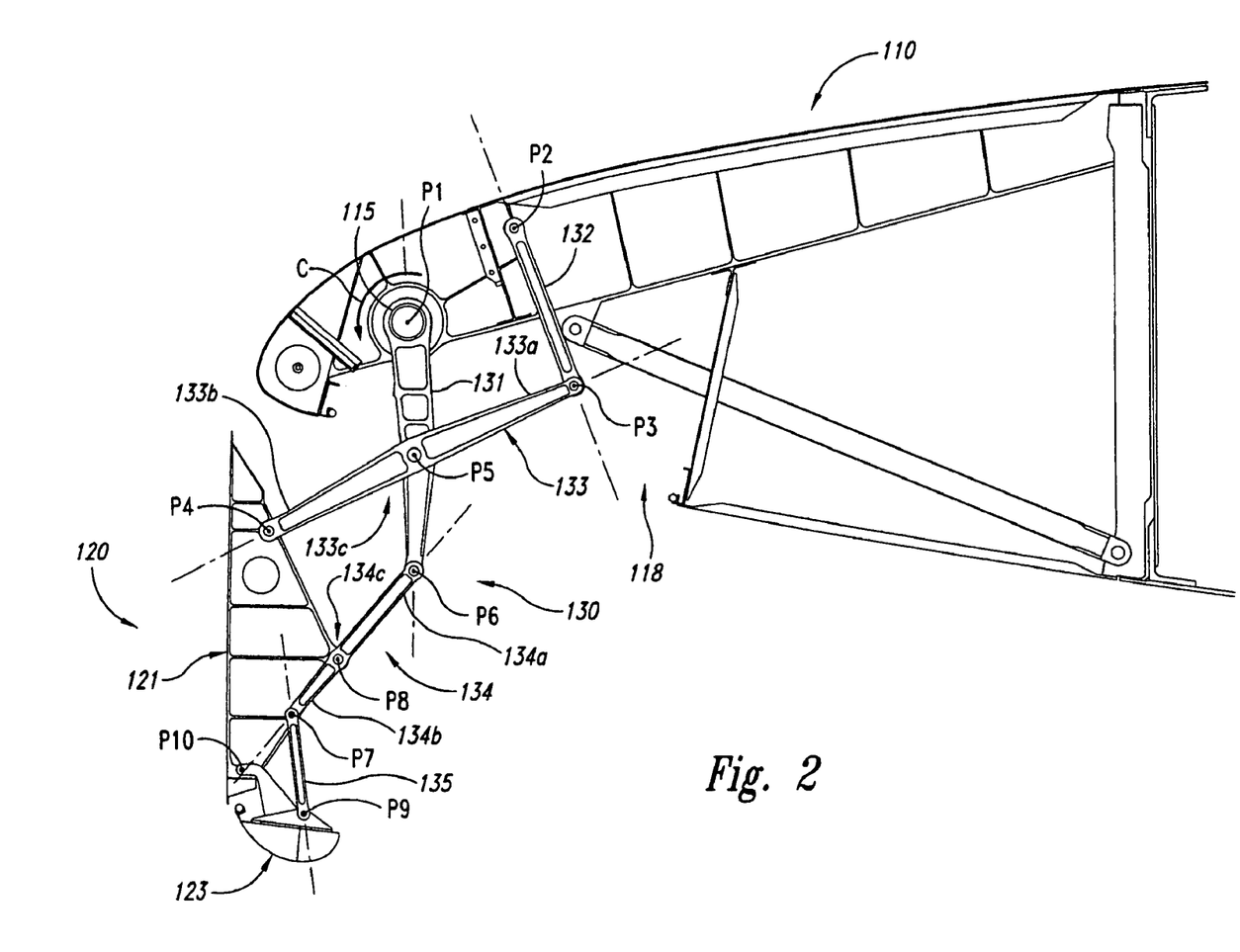
FIG. 2 illustrates the system shown in FIG. 1 in another deployed position.

Referring now to FIG. 2, the torque tube 115 has rotated counterclockwise as indicated by arrow C to move the leading edge panel 121 and the bullnose 123 toward the opening 118. In this position, the leading edge assembly 120 can form a very blunt "barn door" configuration which slows the aircraft down, for example, during landing rollout. In this position, and in other deployed positions, the leading edge panel 121 and therefore the link mechanism 130 can be subject to high loads generated by aerodynamic forces acting on the forwardly-facing leading edge panel 121. The arrangement of the link mechanism 130 can be organized to efficiently transmit the aerodynamic loads to the airfoil 110. For example, each of the links can be generally straight, so as to transmit loads generally in compression or tension, without incurring significant bending loads. In a particular example, the first positioning link 133 can have a first end 133a, a second end 133b, and an intermediate portion 133c. The first positioning link 133 can be pivotably connected toward its first end 133a to the second support link 132 at a pivot joint P3. The first positioning link 133 can be connected toward its second end 133b to the leading edge panel 121 at another pivot join P4, and can be connected toward its intermediate portion 133c to the first support link 131 at still another pivot joint P5. As shown by phantom lines in FIG. 2, the pivot joints P3, P5, and P4 can be aligned along a generally straight line, and the first end 133a, second end 133b, and intermediate portion 133c, can also be aligned along a generally straight line. Accordingly, the first positioning link 133 can efficiently transmit compression loads from the leading edge panel 121 to the first support link 131 and the second support link 132. These loads are then transmitted to the structure of the airfoil 110.

Other links of the link mechanism 130 can have a generally similar arrangement. For example, the second positioning link 134 can include a first end 134a, a second end 134b, and an intermediate portion 134c. Each of these portions can be aligned along a generally straight line, as can a corresponding pivot point P6 between the second positioning link 134 and the first support link 131, a pivot point P7 between the second positioning link 134 and the third positioning link 135, and a pivot point P8 between the second positioning link 134 and the leading edge panel 121. The third positioning link 135 can be aligned along a generally straight axis between its two pivot points P7 and P9, and both the first support link 131 and the second support link 132 can also be aligned along generally straight axes (e.g., pivot points P1, P5 and P6 can be aligned along a generally straight axis for the first support link 131, and pivot points P2 and P3 can be aligned along a generally straight axis for the second support link 132). In particular embodiments, the ends of any of the links can be offset from each other by relatively small angular amounts (e.g., less than 20°, or less than 10°) without significantly detracting from the structural efficiency of the links. For example, as shown in FIG. 2, both the first support link 131 and the first positioning link 133 have relatively small angular offsets between oppositely located pivot points P1, P6 and P3, P4, respectively.

Figure 3:
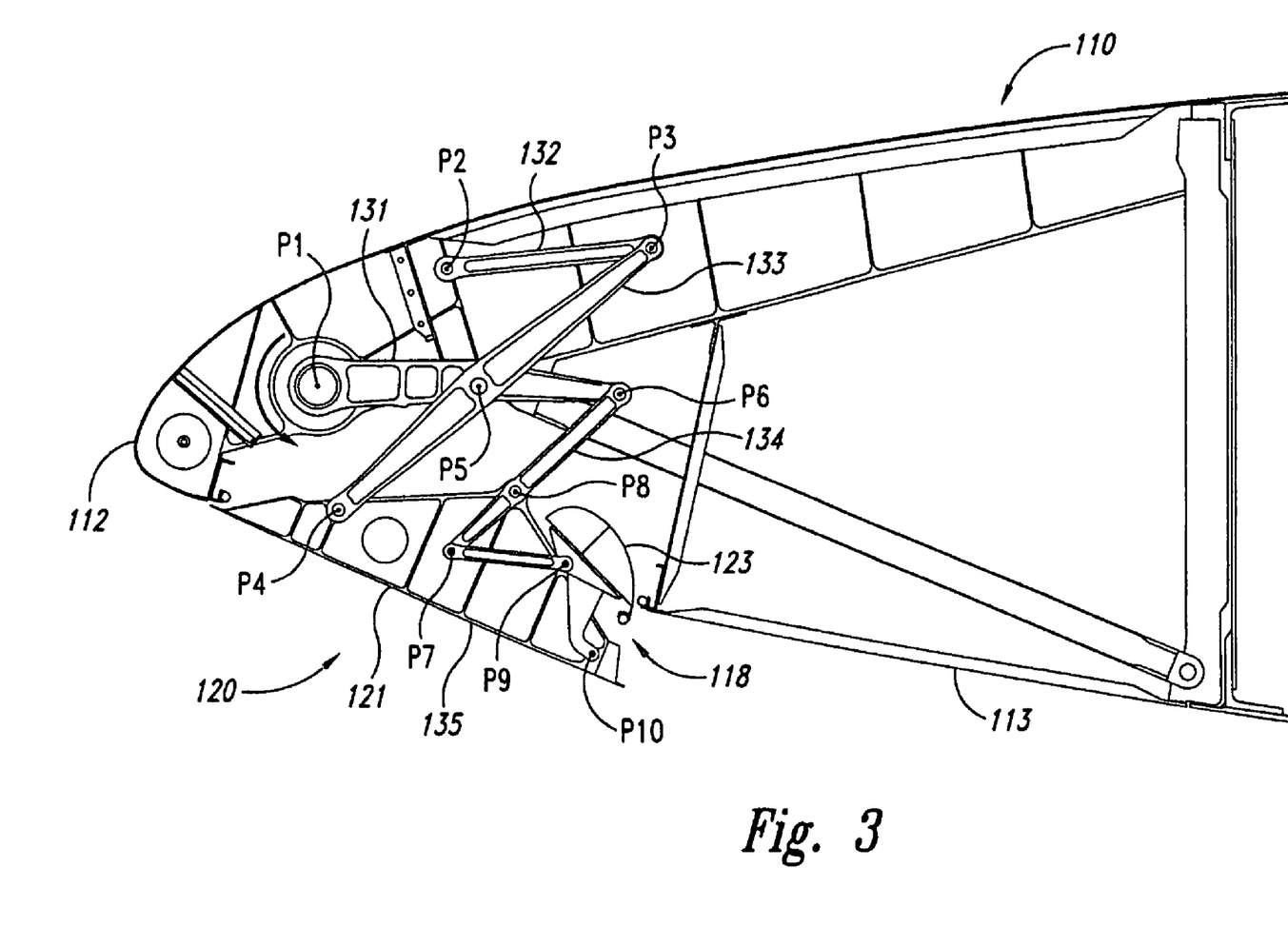
FIG. 3 illustrates the system shown in FIG. 1 in a partially retracted position.

FIG. 3 illustrates the leading edge assembly 120 as it approaches its stowed position. The leading edge panel 121 is rotated toward the opening 118 and the bullnose 123 is folded about its pivot point P10 relative to the leading edge panel 121. As is clearly visible in FIG. 3, the first positioning link 133 and the first support link 131 form a "scissors" configuration relative to each other, and the second positioning link 134 forms a scissors configuration relative to the leading edge panel 121. This double scissors configuration is one characteristic of an embodiment of the link mechanism 130 that allows it to move the leading edge panel 121 over a significant distance between the deployed position shown in FIG. 1 and the fully stowed position described below with reference to FIG. 4.

Figure 4:
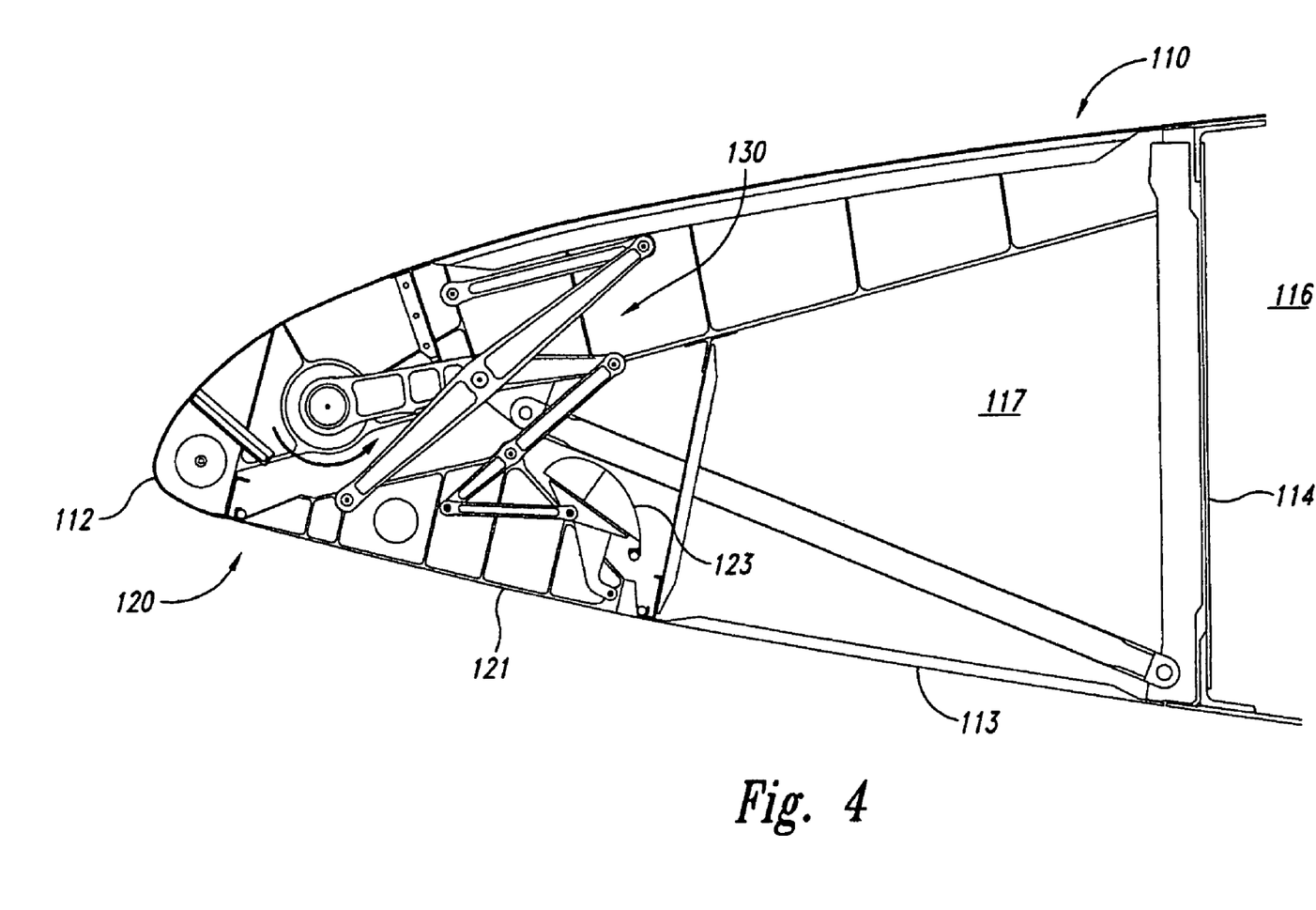
FIG. 4 illustrates the system shown in FIG. 1 in a fully retracted position.

FIG. 4 illustrates the leading edge assembly 120 in its fully stowed position. In this configuration, the leading edge panel 121 has been folded toward the airfoil 110 so as to be flush with the leading edge 112 and the lower surface 113, with the bullnose 123 and the link mechanism 130 housed completely within the dry bay 117. In this configuration, the airfoil 110 is typically flown at conditions not requiring enhanced lift performance, for example, sustained cruise conditions.

One feature of embodiments of the system described above with reference to FIGS. 1-4 is that the link mechanism 130 can have five links (e.g., two support links and three positioning links). An advantage of this arrangement when compared with other link arrangements having more than five links is that it can be simpler to manufacture, install, and maintain. Another advantage when compared to link mechanisms having fewer than five links is that it can position the leading edge panel 121 significantly forward of the airfoil leading edge 112 to form a large or relatively large gap 101. This is expected to improve the aerodynamic performance of the overall system when the leading edge assembly 120 is in its deployed configuration.

Another feature of at least some embodiments of the system described above with reference to FIGS. 1-4 is that the links in the link mechanism 130 can be generally straight. This is unlike some Krueger flap link arrangements which include significantly offset or "gooseneck" links. An advantage of the relatively straight links is that they are structurally efficient. For example, they can efficiently carry loads in tension and compression, without being subjected to significant bending loads. As a result, each of the links can be relatively small in size (as a result of not having to sustain significant bending loads), which can in turn reduce the overall weight of the link mechanism 130. Reduced weight increases the fuel efficiency of the aircraft on which the link mechanism 130 is installed, and/or the ability of the aircraft to carry a large payload.

Still another feature of embodiments of the system described above is that the flow surfaces of the leading edge assembly can have a generally fixed shape. For example, the streamwise flow surface 124 of the leading edge panel 121, and the streamwise bullnose flow surface 125 can both have generally fixed shapes. An advantage of this arrangement is that it can be simpler than existing variable camber Krueger flaps to install and maintain. In particular, existing variable geometric flow surfaces typically require a significantly more complex arrangement of links (to adequately control the shapes of the flexible flow surfaces) than are included in at least some of the embodiments described above.

Figure 5:
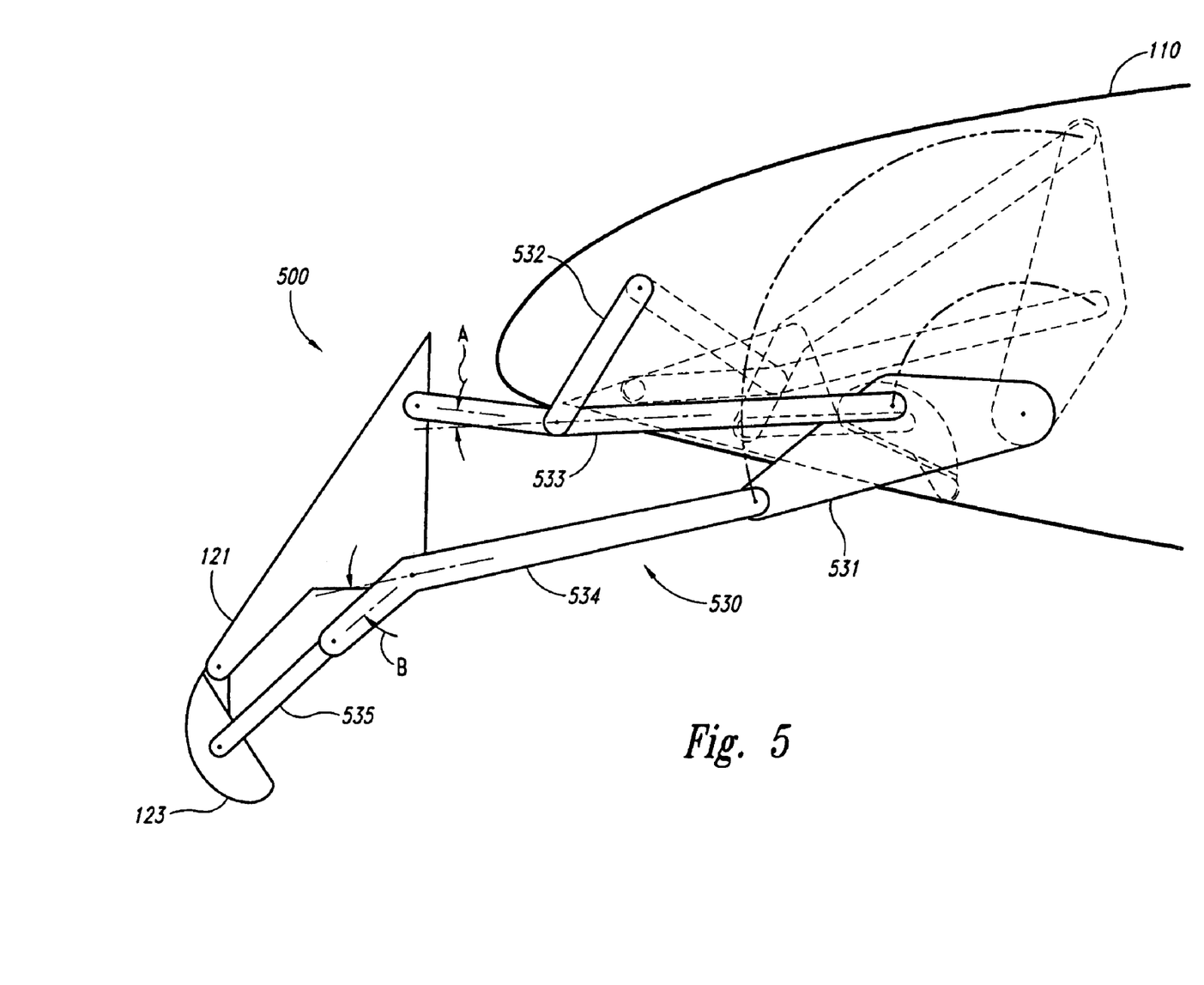
FIG. 5 illustrates a system having a leading edge assembly and link mechanism configured in accordance with another embodiment of the invention.

FIG. 5 is a partially schematic, cross-sectional side view of a system 500 having a link mechanism 530 configured in accordance with another embodiment of the invention. The link mechanism 530 is shown in solid lines in its deployed position, and in dashed lines in its stowed position. The system 500 can include an airfoil 110, leading edge panel 121, and a bullnose 123 that are generally similar to the corresponding elements shown in FIGS. 1-4. The link mechanism 530 can include five links (as does the link mechanism 130 shown in FIG. 1) that are configured and arranged in a different manner than that shown in FIG. 1. For example, the link mechanism 530 can include a first support link 531 positioned aft of a second support link 532. This is unlike the arrangement shown in FIG. 1, in which the first support link (e.g., the driven support link 131, with three pivot points) is positioned forward of the second support link. The link mechanism 530 can also include first, second and third positioning links 533, 534, and 535, with the first and second positioning links 533, 534 having increased angular offsets when compared with the corresponding links shown in FIG. 1. For example, the first positioning link 533 can have an angular offset angle A of about 10°, as compared with a corresponding offset angle of less than 5° for the first positioning link 133 shown in FIG. 2. The second positioning link 534 shown in FIG. 5 can have an offset angle B of about 30° as compared with a corresponding offset angle for the second positioning link 134 shown in FIG. 2 of less than 5°. The offset angles shown in FIG. 5 may allow for a potentially more compact arrangement, without significantly impacting structural efficiency. For example, while the offset angle B for the second positioning link 534 may be larger than that for the second positioning link 134 shown in FIG. 2, the load placed on the second positioning link 534 by the bullnose 123 may be low enough so as not to require a significant increase in size for the second positioning link 534.

Figure 6:
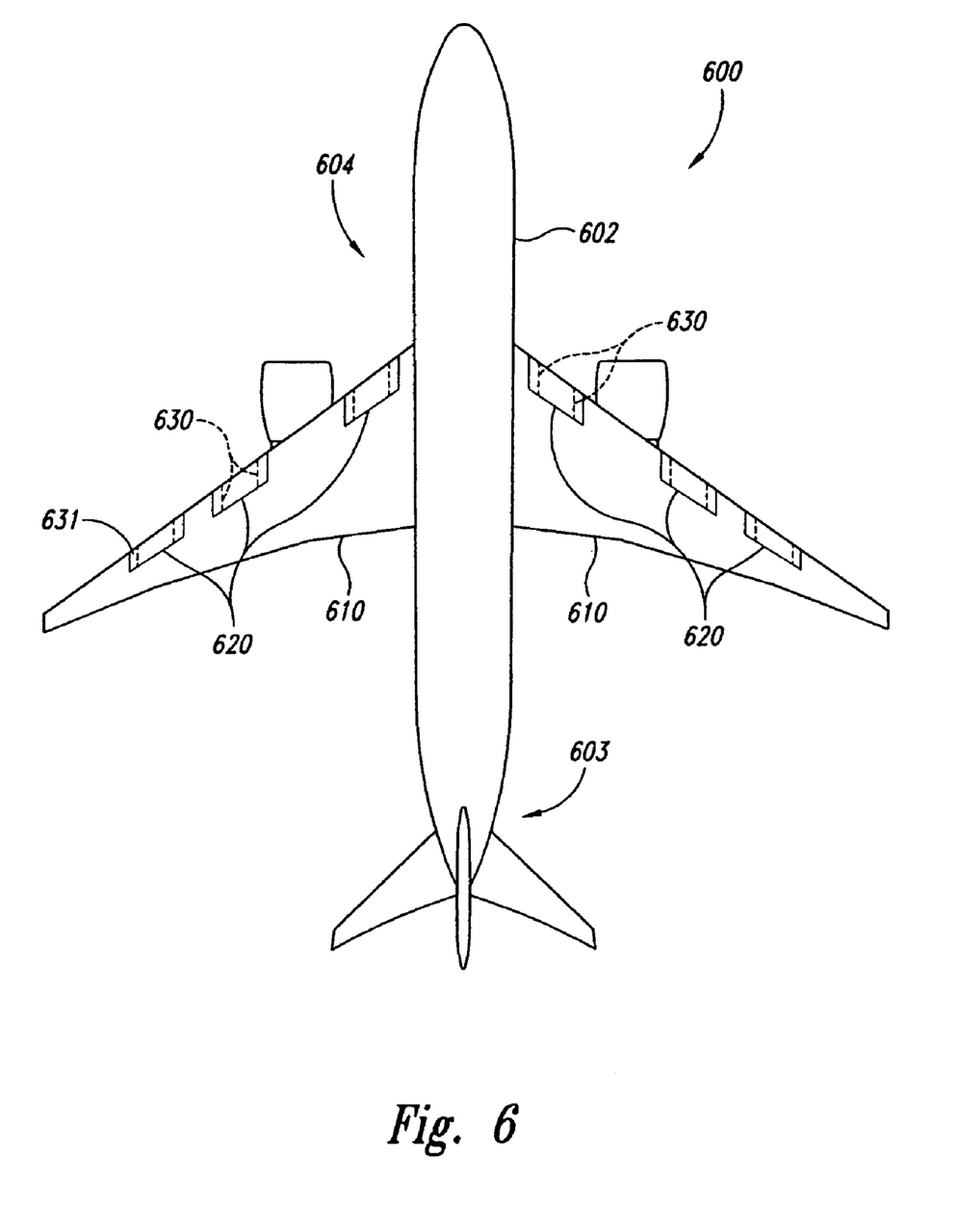
FIG. 6 illustrates a system that includes a leading edge assembly installed on an aircraft in accordance with another embodiment of the invention.

FIG. 6 is a schematic illustration of a system 600 that includes an aircraft 604 having leading edge assemblies with multiple link mechanisms configured in accordance with another embodiment of the invention. The aircraft 604 can include a fuselage 602, wings 610 and an empennage 603. Each wing 610 can include one or more leading edge assemblies 620 (three are shown on each wing in FIG. 6). Each leading edge assembly 620 can include a leading edge panel 621 carried by multiple link mechanisms 630. For example, in an embodiment shown in FIG. 6, each leading edge panel 621 is carried by two link mechanisms 630, each located at a different spanwise location. In other embodiments, each leading edge panel 621 can be carried by more than two link mechanisms. Each of the link mechanisms 630 can include a five-link arrangement generally similar to any of the arrangements described above with reference to FIGS. 1-5.

From the foregoing, it will be appreciated that the specific embodiments of the invention have been described herein for purposes of illustration, but that various modifications may be made without deviating from the invention. For example, in some embodiments, the linkages may have different shapes or arrangements than are shown in the Figures. In still further embodiments, the actuator may be coupled to different links than are shown in the illustrated embodiments, and/or may have a different arrangement than a torque tube arrangement. Aspects of the invention described in the context of particular embodiments may be combined or eliminated in other embodiments. For example, features of the link mechanism shown in FIG. 5 may be combined with features of the link mechanism shown in FIG. 1. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An aircraft system, comprising:
    a deployable leading edge assembly that includes:
        a deployable leading edge panel that forms a gap with an airfoil when in a deployed position, wherein the deployable leading edge panel has a generally fixed-shape flow surface extending from a leading end to the gap when in the deployed position, and has the same generally fixed shape flow surface when in a stowed position;
        a bullnose pivotably coupled to the leading edge panel;
        a link mechanism coupled to the leading edge panel and the bullnose at a wing span location to move the leading edge panel between the stowed position and the deployed position, the link mechanism having:
            a first support link pivotably coupleable to the airfoil;
            a second support link pivotably coupleable to the airfoil and spaced apart from the first support link; and
            first, second, and third positioning links pivotably connected among the leading edge panel, the bullnose, the first support link and the second support link, wherein the positioning links are the only positioning links coupled between the support links, the leading edge panel and the bullnose at the wing span location.

2. The system of claim 1, further comprising the airfoil, and wherein:
    the first and second support links are pivotably coupled to the airfoil;
    the first positioning link is pivotably connected to the first support link, the second support link and the leading edge panel;
    the second positioning link is pivotably connected to the first support link, the leading edge panel and the third positioning link; and
    the third positioning link is pivotably connected between the second positioning link and the bullnose.

3. The system of claim 2 wherein:
    the first positioning link has a first end, a second end, and an intermediate portion between its first and second ends, the first positioning link being pivotably connected to the second support link toward its first end, pivotably connected to the leading edge panel toward its second end, and pivotably connected to the first support link at its intermediate portion to form a scissors arrangement with the first support link; and
    the second positioning link has a first end, a second end, and an intermediate portion between its first and second ends, the second positioning link being pivotably connected to the first support link toward its first end, pivotably connected to the third positioning link toward its second end, and pivotably connected to the leading edge panel at its intermediate portion.

4. The system of claim 1 wherein the first support link and the first positioning link each have three pivot joints coupled to adjacent elements, and wherein the three pivot joints of the first support link are at least approximately co-linear, and wherein the three pivot joints of the first positioning link are at least approximately co-linear.

5. The system of claim 1, further comprising the airfoil, and wherein the first and second support links are pivotably coupled to the airfoil.

6. The system of claim 5 wherein the airfoil has an airfoil chord length, and wherein the leading edge panel forms a gap that is at least 2% of the airfoil chord length when in the deployed position.

7. The system of claim 1 wherein the link mechanism is a first link mechanism and the wing span location is a first wing span location, and wherein the system further comprises a second link mechanism having an arrangement of links generally the same as that of the first link mechanism, the second link mechanism being positioned at a second wing span location spaced apart in spanwise direction from the first wing span location.

8. The system of claim 1 wherein the first support link is coupled to an actuator.

9. The system of claim 1 wherein the leading edge panel has a streamwise flow surface that is exposed to freestream airflow when in both the stowed and the deployed positions.

10. The system of claim 1 wherein each of the links is generally straight.

11. The system of claim 1 wherein the first support link has three pivot locations positioned along a generally straight line.

12. The system of claim 1 wherein the first positioning link has three pivot locations positioned along a generally straight line.

13. The system of claim 1 wherein the second positioning link has three pivot locations positioned along a generally straight line.

14. The system of claim 1 wherein for each link, opposite ends of the link are offset by 20 degrees or less.

15. The system of claim 1 wherein for each link, opposite ends of the link are offset by 40 degrees or less.

16. The system of claim 1 wherein both the leading edge panel and the bullnose have generally fixed-shape, streamwise flow surfaces.

17. The system of claim 1 wherein the first support link and the first positioning link form a first scissors configuration, and wherein the leading edge panel and the second positioning link form a second scissors configuration.

18. An aircraft wing system, comprising:
an airfoil;
a deployable leading edge assembly that includes:
  a deployable leading edge panel forming a gap with the airfoil when in a deployed position and having a generally rigid, fixed-shape flow surface extending from a leading end to the gap when in the deployed position and having the same generally fixed shape flow surface when in a stowed position;
  a bullnose pivotably coupled to the leading edge panel and having a generally rigid, fixed-shape flow surface;
  a link mechanism coupled to the leading edge panel, the bullnose and the airfoil at a wing span location to move the leading edge panel between the stowed position and the deployed position, the link mechanism having:
    a first support link pivotably coupled to the airfoil;
    a second support link pivotably coupled to the airfoil and positioned aft of the first support link;
    a first positioning link pivotably connected to the first support link, the second support link and the leading edge panel;
    a second positioning link pivotably connected to the second support link, the leading edge panel and the third positioning link; and
    a third positioning link pivotably connected between the second positioning link and the bullnose, wherein the leading edge panel forms a gap with the airfoil when in the deployed position, and wherein the positioning links are the only positioning links coupled between support links, the leading edge panel and the bullnose at the wing span location.

19. The system of claim 18 wherein each of the links is generally straight.

20. The system of claim 18 wherein for each link, opposite ends of the link are offset by 20 degrees or less.

21. The system of claim 18 wherein for each link, opposite ends of the link are offset by 40 degrees or less.

22. A method for operating an aircraft wing system, comprising:
deploying a leading edge panel and a bullnose relative to an airfoil by:
  rotating a first support link pivotably coupled to the airfoil at a wing span location;
  rotating a second support link pivotably coupled to the airfoil and positioned aft of the first support link;
  rotating first, second, and third positioning links pivotably connected among the leading edge panel, the bullnose, the first support link and the second support link, wherein the positioning links are the only positioning links coupled between support links, the leading edge panel and the bullnose at the wing span location;
  forming a gap between the airfoil and a generally fixed-shape streamwise flow surface of the leading edge panel;
  moving the leading edge panel from a stowed position to a deployed position wherein the leading edge panel maintains the same generally fixed shape flow surface between a leading end to the gap in the deployed position and the stowed position; and
  rotating the bullnose relative to the leading edge panel.

23. The method of claim 22 wherein deploying the leading edge panel includes moving the leading edge panel from a stowed position in which the panel forms a part of a lower surface of the airfoil, to a deployed position in which at least part of the panel is located forward of a leading edge of the airfoil.

24. The method of claim 22 wherein forming a gap includes forming a gap that is at least 2% of a chord length of the airfoil.

25. The method of claim 22 wherein rotating the first, second, and third positioning links includes rotating the first positioning link and the first support link relative to each other in a scissors manner, and rotating the second positioning link and the leading edge panel relative to each other in a scissors manner.

* * * * *

UNITED STATES PATENT AND TRADEMARK OFFICE
CERTIFICATE OF CORRECTION

PATENT NO. : 7,578,484 B2  Page 1 of 1
APPLICATION NO. : 11/453596
DATED : August 25, 2009
INVENTOR(S) : Stephen J. Fox et al.

It is certified that error appears in the above-identified patent and that said Letters Patent is hereby corrected as shown below:

On page 4, in column 1, under "Other Publication", line 33, delete "America" and insert -- American --, therefor.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO.       : 7,578,484 B2
APPLICATION NO.  : 11/453596
DATED            : August 25, 2009
INVENTOR(S)      : Fox et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this

Seventh Day of September, 2010

David J. Kappos
*Director of the United States Patent and Trademark Office*